(12) United States Patent
Visintin et al.

(10) Patent No.: US 10,284,059 B2
(45) Date of Patent: May 7, 2019

(54) DEVICE FOR MANUFACTURING A STATOR

(71) Applicant: General Electric Technology GmbH, Baden (CH)

(72) Inventors: Massimiliano Visintin, Zürich (CH); Walter Soehner, Karlsruhe (DE)

(73) Assignee: General Electric Technology GmbH, Baden (CH)

( * ) Notice: Subject to any disclaimer, the term of this patent is extended or adjusted under 35 U.S.C. 154(b) by 6 days.

(21) Appl. No.: 15/483,230

(22) Filed: Apr. 10, 2017

(65) Prior Publication Data

US 2017/0214301 A1    Jul. 27, 2017

Related U.S. Application Data

(62) Division of application No. 14/154,597, filed on Jan. 14, 2014, now Pat. No. 9,653,972.

(30) Foreign Application Priority Data

Jan. 14, 2013    (EP) ..................................... 13151203

(51) Int. Cl.
*H02K 15/02*    (2006.01)
(52) U.S. Cl.
CPC ........ *H02K 15/02* (2013.01); *Y10T 29/49009* (2015.01)
(58) Field of Classification Search
CPC ...... H05K 15/10; H05K 15/085; H05K 15/09; H02K 15/02; Y10T 29/49009
See application file for complete search history.

(56) References Cited

U.S. PATENT DOCUMENTS

| 2,484,001 | A | 10/1949 | Raymond |
| 6,201,334 | B1 | 3/2001 | Sargeant et al. |
| 7,202,587 | B2* | 4/2007 | Sargeant ................ H02K 1/185 310/418 |
| 7,353,586 | B2* | 4/2008 | Majernik ................ H02K 1/185 29/50 |
| 7,573,170 | B2 | 8/2009 | Petro et al. |
| 7,576,468 | B2 | 8/2009 | Petro et al. |
| 7,716,817 | B2* | 5/2010 | Mall .................... H02K 15/063 140/92.1 |
| 8,319,405 | B2* | 11/2012 | Allen .................... H02K 1/185 310/413 |
| 8,471,425 | B2 | 6/2013 | Petro et al. |
| 9,257,873 | B2* | 2/2016 | Vitello .................. H02K 1/185 |
| 2006/0087186 | A1 | 4/2006 | Wasson et al. |
| 2006/0131985 | A1 | 6/2006 | Qu et al. |

FOREIGN PATENT DOCUMENTS

| EP | 1 592 110 B1 | 6/2011 |
| EP | 2 615 727 A1 | 7/2013 |
| JP | H0715924 A | 1/1995 |
| JP | 2002369461 A | 12/2002 |
| WO | 2012/040538 A1 | 3/2012 |

* cited by examiner

*Primary Examiner* — Carl J Arbes
(74) *Attorney, Agent, or Firm* — GE Global Patent Operation; Rita D. Vacca

(57) ABSTRACT

The method for manufacturing a stator of an electric machine includes providing a lamination element extending over an annular sector, horizontally moving the lamination element towards a fitting zone, then angularly regulating the lamination element position, and connecting the lamination element to other lamination elements to define the stator.

3 Claims, 3 Drawing Sheets

Fig. 1
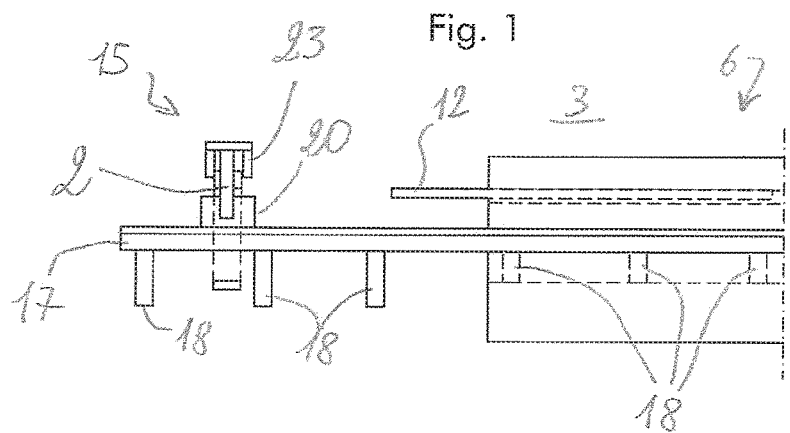
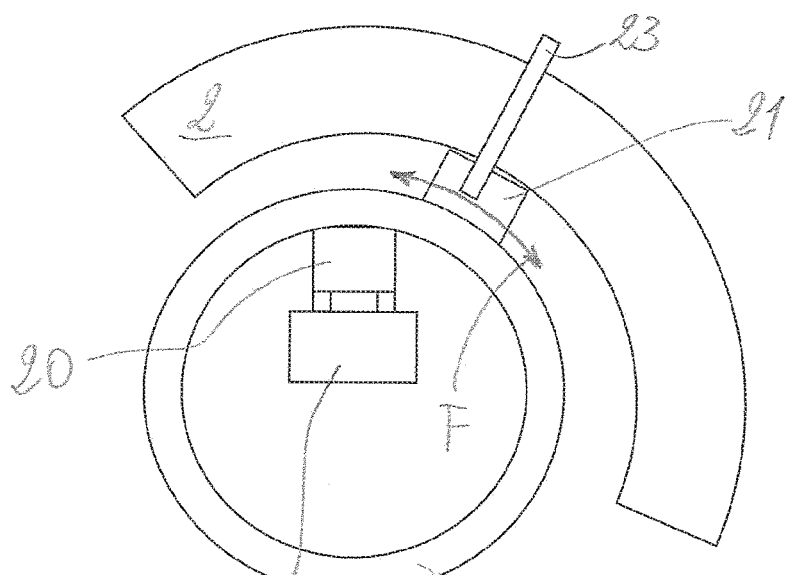
Fig. 2
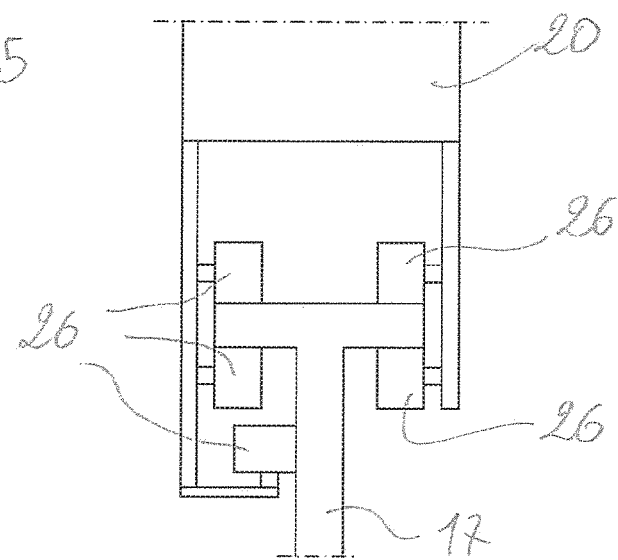
Fig. 3

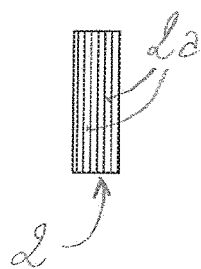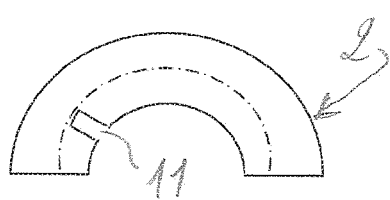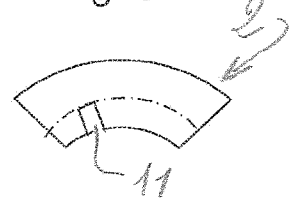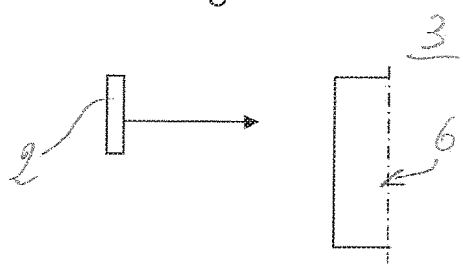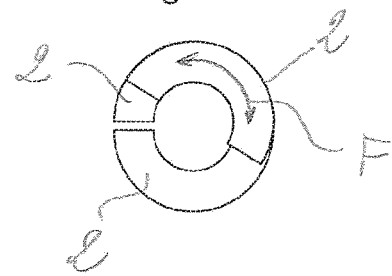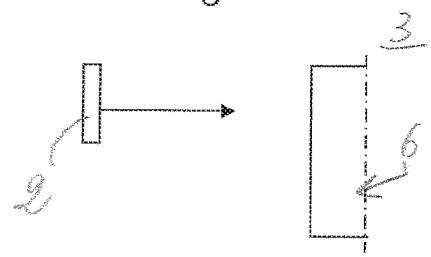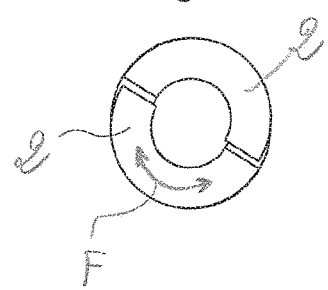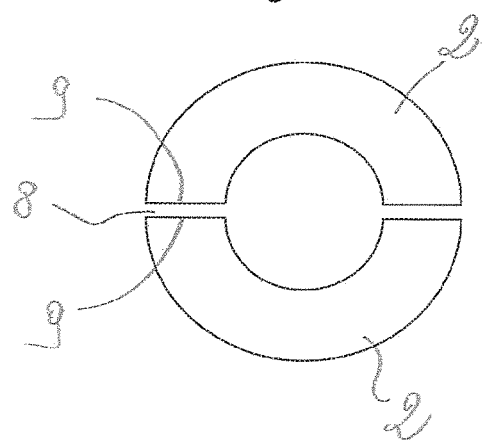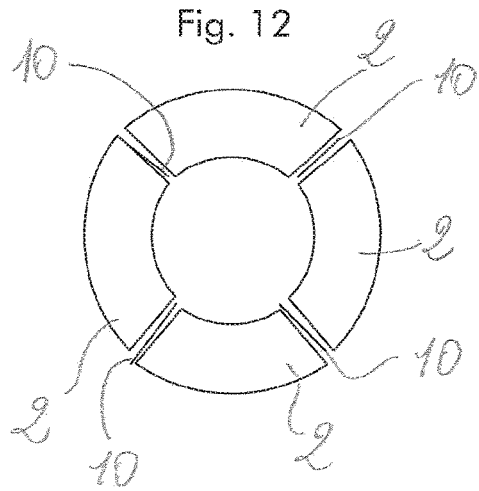

DEVICE FOR MANUFACTURING A STATOR

CROSS-REFERENCE TO RELATED APPLICATIONS

This application claims priority to and is a divisional application of pending U.S. application Ser. No. 14/154,597, filed Jan. 14, 2014, which claims priority to European application 13151203.0 filed Jan. 14, 2013, the contents of each hereby incorporated in their entirety.

TECHNICAL FIELD

The present disclosure relates to a method and a device for manufacturing a laminated stator core.

The laminated stator core can be a part of an electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

A laminated stator core is made by a plurality of laminations that are stacked and fixed together to form an annular body.

In order to manufacture the stator, EP 1 592 110 discloses to group a number of laminations together to form "donuts" (i.e. annular elements made of a plurality of laminations) and to horizontally stack the donuts.

In addition, EP 1 592 110 also discloses a device having a rail with removable supports and a dolly movable on top of the rail; the dolly has a saddle that can hold the donuts.

During operation, the donuts are provided on top of the saddle, and then the dolly is moved towards the stator that must be manufactured.

In order to support the rail, a plurality of supports must be connected to the rail and, when the dolly with a donut on it must cross a support, this support is removed while other supports are not (i.e. one support is removed while other supports are not removed such that the dolly can cross the zone from which the support has been removed while the rail is supported by the other supports).

Then the removed support is connected to the rail again and another support is removed, until the dolly reaches its final position to assemble the donut to the stator.

Because of the need to connect and disconnect the supports from the rail, manufacturing can be time consuming.

SUMMARY

An aspect of the disclosure includes providing a device and a method by which manufacturing time can be optimised.

In particular, time manufacturing is optimised because the need to connect and disconnect the supports to and from the rail is limited or avoided.

These and further aspects are attained by providing a device and method in accordance with the accompanying claims.

BRIEF DESCRIPTION OF THE DRAWINGS

Further characteristics and advantages will be more apparent from the description of a preferred but non-exclusive embodiment of the method and device, illustrated by way of non-limiting example in the accompanying drawings, in which:

FIG. 1 is a schematic side view of a device of the disclosure;

FIG. 2 is a schematic front view of a particular of the device;

FIG. 3 is a particular of a rail and dolly of the device;

FIGS. 4 through 6 show examples of annular sector laminar elements;

FIGS. 7 through 10 show steps of the method;

FIGS. 11 and 12 show front view of the annular sector laminar elements of a stator.

DETAILED DESCRIPTION

Figure 13:
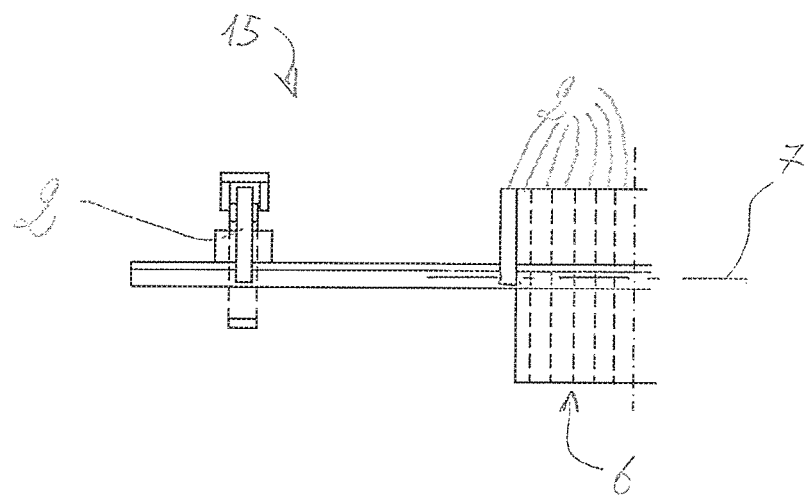
FIGS. 13 and 14 show detail of the method and stator realised according to the method.

The method for manufacturing a stator of an electric machine comprises:
providing lamination elements 2 extending over an annular sector, i.e. they do not define a closed annular element,
horizontally moving the lamination element 2 towards a fitting zone 3, then
angularly regulating the lamination element position (as indicated by arrow F),
connecting or fixing the lamination elements 2 to other lamination elements 2 to define a stator 6.

The lamination elements 2 can be defined by single metal sheets 2a that extend over an annular sector but preferably they are defined by a group of metal sheets 2a held and/or connected together and preferably impregnated with a resin as for example described in U.S. Pat. No. 6,201,334 or also EP 1 592 110; however different methods like simple impregnation processes (i.e. not necessary vacuum-pressure impregnation, like simple resin dipping) can be followed as well. In addition, also other methods to connect together the metal sheets 2a are possible.

All the metal sheets 2a of a lamination element 2 extend over an annular sector and preferably have the same shape and dimension.

When connecting the lamination elements 2, in a plane perpendicular to a stator longitudinal axis 7, a gap 8 is generally obtained between adjacent parts 9 of the lamination elements 2; for example, insulation 10 can be provided in the gap 8, but this is not mandatory. The insulation 10 can be resin and/or a mica or mica containing element. The insulation is shown in connection with the embodiment of FIG. 12, but it can be used together with any embodiment of the invention.

The method can be used as a repair method for stator cores (but this is not mandatory), in this case before horizontally moving the lamination elements 2 towards the fitting zone 3, one or more lamination sheets 2a or lamination elements 2 are removed from an existing stator 6 and then the lamination elements 2 are moved towards the fitting zone 3 and fixed to the existing stator 6 to replace the lamination sheets 2a or lamination elements 2 that were removed.

The lamination elements 2 have indentations 11 that when the lamination elements 2 are connected each other define stator slots. Preferably, after angularly regulating the lamination element position and before connecting the lamination elements 2, the lamination elements 2 are aligned. Alignment is carried out with respect to the indentations 11.

For example, the alignment is carried out by providing a template element 12 (for example in the form of a dummy bar) in the indentations 11. This way the lamination elements 2 are aligned at the slots, thus providing a smooth surface of the stator slot, which can be efficiently in contact to the external surface of the stator bars; this provides a good electrical connection between the surfaces as well as a proper mechanical fixation of the stator bars, thus reducing the likelihood of local partial discharges and/or vibrations during operation, otherwise both effects can give rise to accelerated aging and ultimately to electric machine failures. In this case, provision of more than two lamination elements such as four or also more in each plane perpendicular to the axis 7 can be advantageous, because the alignment at the indentations 11 can be improved and the overall core stacking operation is faster. It is anyhow clear that such an alignment is advantageous also with only two lamination elements 2 in each plane perpendicular to the axis 7.

The present invention also refers to a device 15 for manufacturing a stator 6 by stacking lamination elements 2.

The device comprises:
a rail structure 17,
supports 18 for the rail structure 17,
a dolly 20 on the rail structure 17 capable of traversing at least a portion of the rail structure 17,
a saddle 21 connected to the dolly 20 tailored to compliment an upper inner diameter on the lamination element 2,
blocking elements 23 for holding the lamination element 2 on the saddle 21,
a revolving support 25 for the saddle 21, to angularly regulate the saddle position.

FIG. 3 shows an example of a dolly 20; in particular this figure shows the rail 17 and the dolly 20 that is provided with rollers 26 to drive the dolly movement on the rail 17.

The blocking elements 23 are arranged to withhold the lamination element 2 preventing their separation from the saddle 21 during angular regulation.

For example, the blocking elements 23 are defined by clamps.

The operation of the device 15 is apparent from that described and illustrated and is substantially the following.

The rail 17 is assembled with the supports 18 first.

Than the dolly 20 with the revolving support 25 and the saddle 21 are provided on the rail 17.

Thus, a lamination element 2 is provided on the saddle and is blocked through the blocking elements 23.

The dolly 20 is thus moved towards the fitting zone 3 (FIG. 7); since the lamination elements 2 are not annular but they define an annular sector, they can cross the whole rail 17 without the need of removing and reconnecting the supports 18 (see FIG. 1), to allow the passage of the dolly 20 with the lamination element 2 on it; this reduces the manufacturing time of the stator.

At the fitting zone 3, the saddle 21 is angularly rotated on the revolving support 25 as indicated by arrow F to bring the lamination element 2 to the correct position for its connection to the stator (FIGS. 2 and 8). Once in the correct position, the lamination element 2 is disconnected from the saddle 21 and connected to the stator 6; the dolly 20 is thus brought back to its original position to take another lamination element 2 (FIGS. 9 and 10).

Figure 14:
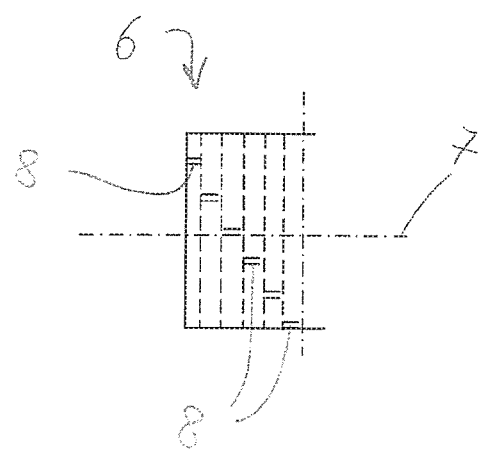

In one embodiment shown in FIG. 14, when the angular position of the lamination element is regulated and adjusted, the gaps 8 of successive lamination elements are not aligned along the axis 7, for example to improve the overall core stiffness and to prevent mechanical and electrical resonances that could cause vibrations and damage of the stator or defective operation.

Naturally the features described may be independently provided from one another.

In practice the materials used and the dimensions can be chosen at will according to requirements and to the state of the art.

The invention claimed is:

1. A device for manufacturing a stator by stacking lamination elements, the device comprising:
 a rail structure;
 supports for the rail structure;
 a dolly on the rail structure operable to traverse at least a portion of the rail structure;
 a saddle connected to the dolly, the saddle complimenting an upper inner diameter of an at least one lamination element;
 blocking elements arranged on opposed sides of the saddle for holding the at least one lamination element on the saddle between the blocking elements; and
 a revolving support, arranged between the dolly and the saddle, operable to
 angularly regulate positioning of the saddle.

2. The device according to claim 1, wherein the blocking elements prevent separation of the at least one lamination element from the saddle.

3. The device according to claim 2, wherein the blocking elements comprise clamps for clamping the at least one lamination element between the blocking elements.

\* \* \* \* \*